Aug. 9, 1966  E. J. PETRICK  3,265,346
TELESCOPING STANDARD
Filed Oct. 6, 1964  2 Sheets-Sheet 1
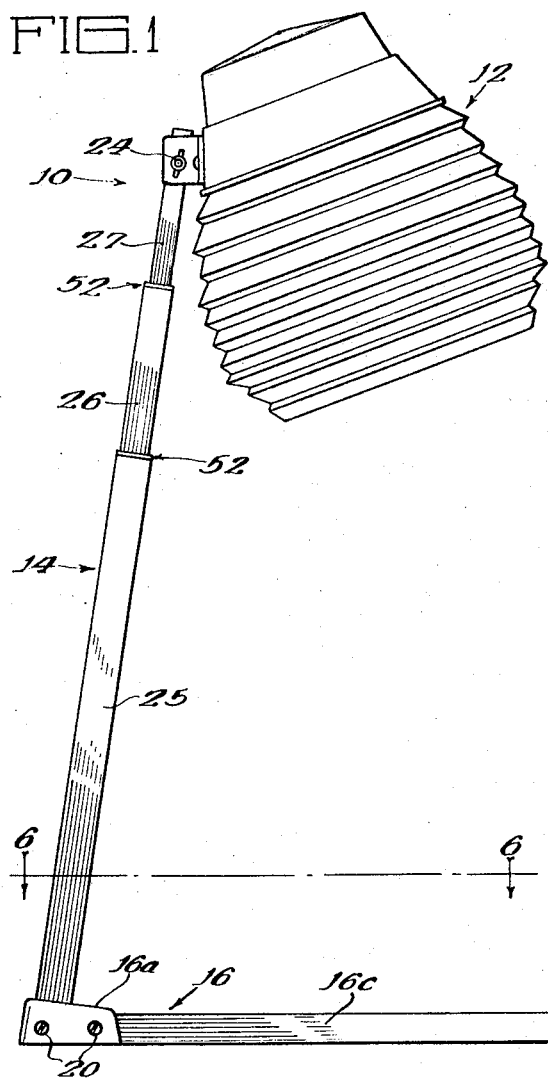
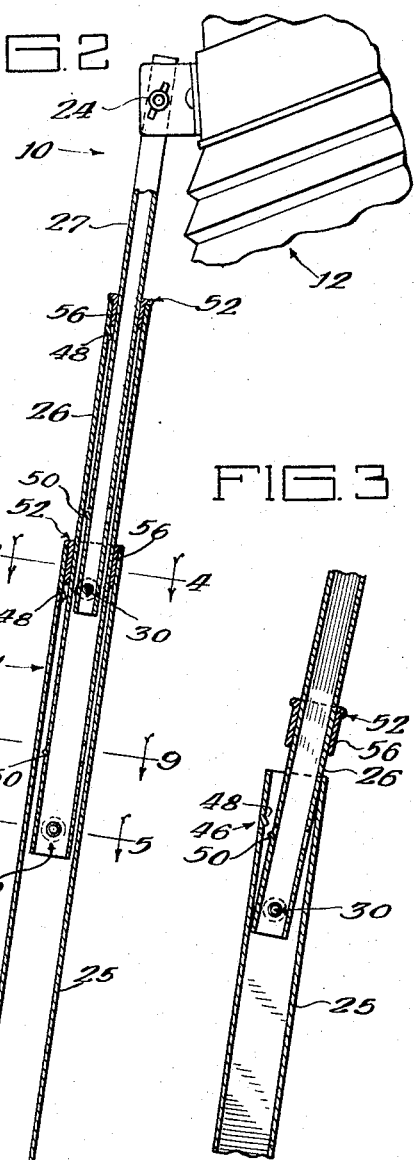
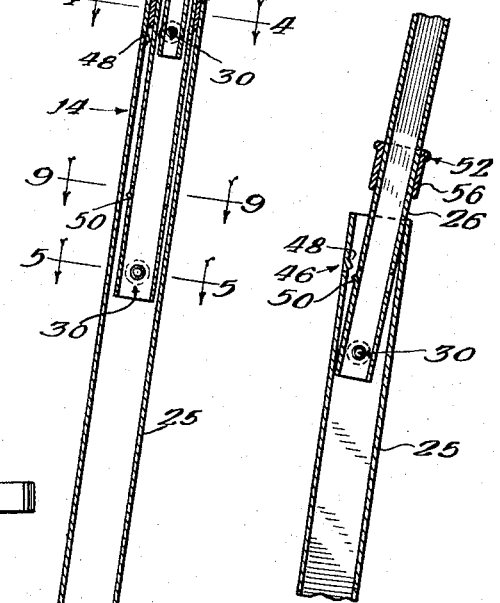
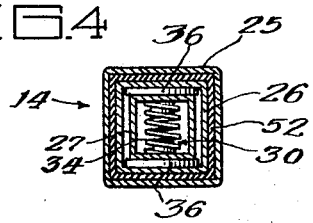
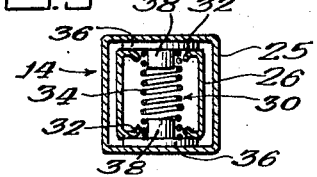
Inventor:
Edward J. Petrick
By: Hofgren, Wegner, Allen,
Stellman & McCord
Attorneys Aug. 9, 1966  E. J. PETRICK  3,265,346
TELESCOPING STANDARD
Filed Oct. 6, 1964  2 Sheets-Sheet 2
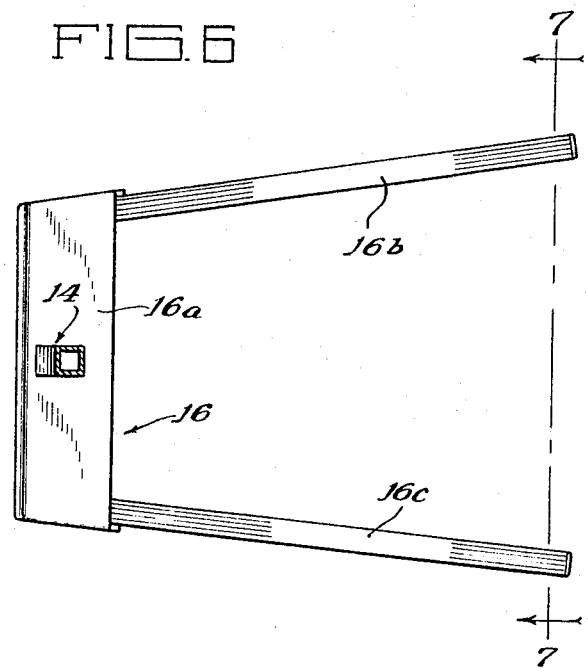
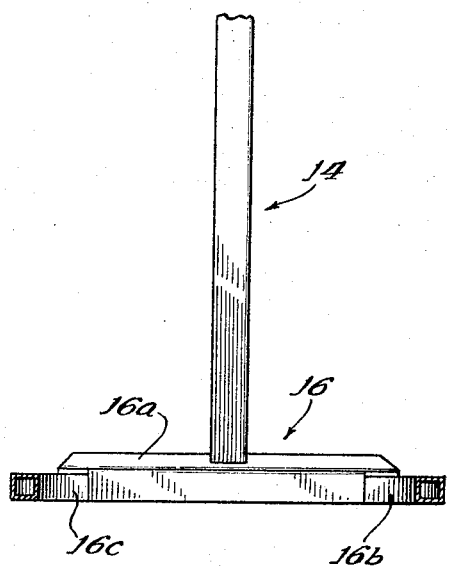
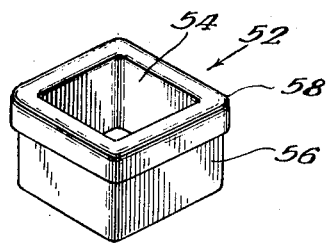
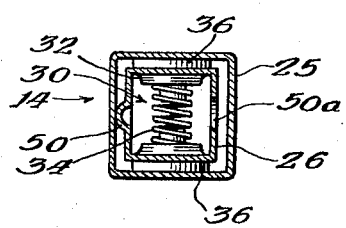
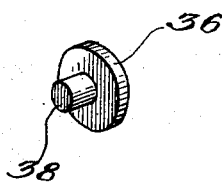

United States Patent Office 3,265,346
Patented August 9, 1966

1

3,265,346
TELESCOPING STANDARD
Edward J. Petrick, Park Ridge, Ill., assignor to Bretford Manufacturing, Inc., a corporation of Illinois
Filed Oct. 6, 1964, Ser. No. 401,801
1 Claim. (Cl. 248—414)

This invention relates to supporting standards, and more particularly to a new and improved extensible telescoping supporting standard having a novel holding and positioning means for holding the standard in different positions of extended adjustment.

Extensible standards are frequently used for supporting the primary component of a device such as for supporting a movie screen or the like. The collapsible nature of such standards facilitates storage of the device. Usually such stands comprise at least one fixed member with one extensible member nested therein. Positive latch means of some nature are provided for holding the standard in selected positions of elevation. Such latching mechanisms require a second releasing or engaging act by the user other than the axial withdrawal of the telescoping member. Commonly such latch means include a portion which projects to the exterior of the stand for manual manipulation. In the interior, there is usually a latch means in the form of a pin and aperture structure, or a frictional clamping structure, for positively locking the extensible member in a preselected position of elevation. This positive locking action must be maintained to support the stand and its primary component against gravity when the telescoping member is extended to a position of use.

It is, therefore, a general object of this invention to provide a new and improved telescoping standard.

It is a primary object of this invention to provide a new and improved telescoping standard which is self-locking in any position of extended adjustment.

Another object of this invention is to provide a new and improved telescoping standard which is self-locking in any position of extended adjustment, free of any external actuation means for locking or unlocking and is provided with means limiting the axial movement of the telescoping member which means permits withdrawal of the telescoping members from each other upon physical manipulation thereof.

It is yet another object of this invention to provide a new and improved telescoping standard which is easily assembled and disassembled and is self-locking in different positions of extended adjustment yet is composed of easily and economically manufactured components.

A further object of this invention is to provide a new and improved telescoping standard having nestable cylindrical sections which have a configuration for limiting the twisting of one section relative to another, the sections being provided with improved bearing means and internal latch means for stabilizing the telescoped assembly in positions of both extended and collapsed adjustment.

Other objects, features and advantages of the present invention will be apparent from the following description of the preferred embodiment illustrated in the accompanying drawings, in which:

FIGURE 1 is a side elevational view of the telescoping standard of this invention shown supporting a hair dryer with the standard illustrated in a partially extended position;

FIGURE 2 is an enlarged fragmentary view, partially broken away in section, of the device shown in FIGURE 1;

FIGURE 3 is a fragmentary section view showing the withdrawal of one section of the telescoping standard from the other by the relative tilting manipulation of the two sections;

2

FIGURE 4 is a section view taken along the line 4—4 of FIGURE 2, illustrating the holding means utilized in the standard of this invention;

FIGURE 5 is a section view taken along the line 5—5 of FIGURE 2, further illustrating the holding means utilized in the standard of this invention;

FIGURE 6 is a section view taken along the line 6—6 of FIGURE 1, showing the top plan configuration of the base member which supports the telescoping standard of this invention;

FIGURE 7 is a section taken along the line 7—7 of FIGURE 6, providing substantially a front elevational view of the base member which supports the standard of this invention;

FIGURE 8 is a perspective view of the bearing member utilized in the standard of this invention;

FIGURE 9 is a section view taken along the line 9—9 of FIGURE 2, illustrating the positioning means of the standard of this invention as well as an element of the means for limiting the axial withdrawal of the sections of the standard; and FIGURE 10 is a perspective view of the button element utilized in the holding means.

Referring now to the drawings, in FIGURE 1 there is shown a hair dryer, indicated generally at 10, comprising a hair drying bonnet 12 which is secured to a supporting standard, indicated generally at 14, of this invention. The supporting standard 14 in turn is mounted on a base 16 which includes a cross-piece 16a and two outwardly extending legs 16b and 16c. Fastening means 20 are provided for securing each of the legs to the cross-piece, and a fastening means, such as bolt 22, is threadably received in an anchoring element 17 wedged in the lower end of standard 14 for securing the standard 14 to the base 16. The hair drying bonnet may be pivoted to the standard as at 24.

The standard 14 comprises a plurality of nestable or telescopable hollow cylindrical sections or rods concentrically mounted within each other for extension relative to each other to raise and lower the hair drying bonnet supported thereon. In the preferred embodiment of this invention, these extensible members or telescopable sections take the form of sections 25, 26 and 27 which are substantially rectangular in cross-section and respectively of smaller external configuration. The largest section 25 forms the lower part of the standard 14 and remains fixed in position; the intermediate section 26 is concentrically slidably received within the fixed section 25, and the smallest section 27 is in turn slidably and concentrically received within the intermediate section 26. The rectangular cross-section of the sections of the supporting standard of this invention limits the tendency of the sections to twist or rotate, one within the other.

For automatically holding and locking the standard in different positions of extended adjustment without the need for any manual manipulation, and free of any pin and aperture or similar positive engagement, holding means 30 is provided. Holding means 30 includes substantially aligned openings 32 which are formed in opposite side walls of each of the sections 26 and 27. An urging or biasing means such as a coil spring 34 is positioned across each of the sections with opposite ends thereof extending through the openings 32. A friction disc or braking member 36, preferably of plastic material, is positioned between the outside of one section and the inner wall of the next largest concentric adjacent section. The means 36 is substantially a disc-like member having a flat face which affords a substantial area of surface contact with the inside of the next largest concentric adjacent section to provide a sufficient amount of frictional engagement therewith. An inwardly projecting hub 38 is formed on the disc-like member 36 and projects through the openings 32 and within the coil spring 34 so that the spring 34 biases against the members 36 in opposition to urge the two members outward into frictional engagement with the inside wall of the next largest concentric adjacent section.

Preferably, the members 36 are made of a material which possesses a relatively high coefficient of friction with the material of which the standard sections are formed and yet which permits the different sections to be slid one within the other through manual, axial, pushing or pulling thereon. In the preferred embodiment, the standard sections are made of steel or a similar metal, and the elements 36 are formed of a plastic or synthetic material such as nylon, Teflon, or the like. The braking members 36 and coil spring 34 of the holding means 30 at the lower end of each section, 26 and 27, provide a stabilizing influence upon these lower ends as the sections are slid relative to each other by virtue of the broad area of yielding frictional engagement between the braking members 36 and the inner surface of the sections 25 and 26, as can be seen in FIGURES 4 and 5.

The urging of the spring 34 in combination with the relative coefficients of friction between the elements 36 and the interior of the next concentric adjacent section is sufficient to hold the standard in different positions of extended adjustment for supporting a primary component, such as the hair dryer illustrated herein, without the need for any positive latching means such as the conventional pin and slot or aperture structure, or similar arrangement. Thus, the holding means of this invention requires no external manipulation for releasing or locking the standard and insures that the standard will be firmly held, with stability against lateral rocking, in any position upon the cessation of the axial pulling or pushing of the sections relative to each other.

Because of the size of concentric adjacent sections, such as 26 and 27, as shown in FIGURE 2, it is desirable to provide a bearing element for promoting stability at the upper end of sections 25 and 26, as well as to enhance slidability of the several sections of the standard. To this end, bearing means 52 are provided, as shown in FIGURE 8. Bearing means 52 is a hollow cap-like element of durable plastic material which is shaped to make a close slidable contact with the outer periphery with the sections of the standard.

In the preferred embodiment, the bearing means 52 is also formed of a plastic or synthetic material such as nylon, Teflon, or the like. As shown in FIGURES 3 and 8, the bearing means 52 is a sleeve-like structure substantially rectangular in configuration for conforming to the configuration of the components of this invention.

The bearing has a rectangular interior configuration, as at 54, which tightly embraces the outer periphery of one of the sections of the standard, and a substantially rectangular outer configuration 56 which is firmly received and frictionally held in nested relation within the inner periphery of the next largest concentric adjacent section. A decorative lip portion 58 is provided in the form of an annular channel which embraces the top of each of the sections 25 and 26 and serves to form a shoulder for limiting the insertion of each bearing means into each section.

As shown in FIGURES 1 and 2, these bearings are preferably inserted at the top or open end of the sections of the standard. Since the preferred embodiment is composed of a fixed section 25 and two successively smaller sections 26 and 27, the bearings 52 are preferably positioned in the top of the fixed member 25 and in the top of the intermediate section 26.

It is further desirable to prevent complete axial withdrawal of the several sections so that the sections will not be completely disassembled except by proper manipulation. To this end, stop means 46 are provided within the several sections. As shown in the drawings, stop means 46 includes an abutment 48 formed on the interior of the next largest concentric adjacent section, and a projection 50 formed on the interior of the next smallest section. As the sections are pulled toward full extension, the abutment 48 and projection 50 will be moved into the path of one another to prevent further withdrawal of the section and thereby preclude the possibility of accidental disassembly of the device.

However, should it be desired to disassemble the device, the bearing means 52 may be removed from the larger concentric adjacent section member and pulled up along the next smaller concentric adjacent member. This permits the two sections to be tilted or manipulated, one relative to the other, so that, as shown in FIGURE 3, the sections may be tilted to a position where the abutment 48 and projection 50 will be allowed to pass one another and the device may be disassembled.

The standard of this invention provides a novel and unique means for supporting a primary component on an extensible member. The need for a separate act of locking or unlocking the extensible member is eliminated. Mere axial withdrawal or insertion, accomplished by simple hand manipulation, is sufficient to position the extensible member in any position of elevation relative to the standard. The holding means and bearing cooperate in a unique manner to afford a rigidity and stability to the standard and yet are components which are simple and economically formed and easily assembled. Furthermore, the stop means is likewise easily provided and permits easy assembly or disassembly by the mere withdrawal of the bearing from its position on a standard section and a tilting between adjacent sections.

The foregoing detailed description is given for clearness of understanding only, and no unnecessary limitations should be understood therefrom for some modifications will be obvious to those skilled in the art.

I claim:

A supporting standard for a hair dryer, comprising: a base; a hollow standard on said base; a plurality of telescopically related rods, each of said rods having at least a pair of opposed flat surfaces; holding means including friction discs interposed between the flat surfaces of said rods, said friction discs having generally flat faces in frictional engagement with the flat inner surface of an outer adjacent rod for retaining the telescoping member in different positions of extension against the influence of gravity, said holding means also including spring means for continually maintaining said frictional engagement with said outer adjacent rod; a sleeve-like bearing on the upper end of each outer rod embracing the next inner telescoping rod, said bearing and holding means maintaining said telescoping rods against lateral movement relative to each other, and stop means in the standard for limiting outward movement of the rods relative to each other and normally preventing withdrawal of one rod from another, said stop means positioned on one side of the rods between said flat faces to permit disengagement and withdrawal of one rod from the other by removing said bearing means from the upper end of the standard and canting the inner rod relative to the outer rod in a direction away from said stop means and withdrawing the inner rod past the stop means in said canted relation thereto.

References Cited by the Examiner

UNITED STATES PATENTS

| | | | |
|---|---|---|---|
| 1,612,148 | 12/1926 | Oettinger | 287—58 |
| 1,919,114 | 7/1933 | Ley | 287—58 |
| 2,845,244 | 7/1958 | Prokop | 248—171 |
| 3,004,743 | 10/1961 | Wenger | 287—58 |

CLAUDE A. LE ROY, *Primary Examiner.*

JOHN PETO, *Examiner.*